(12) United States Patent
Kurtz et al.

(10) Patent No.: US 7,284,444 B2
(45) Date of Patent: Oct. 23, 2007

(54) HERMETICALLY SEALED DISPLACEMENT SENSOR APPARATUS

(75) Inventors: Anthony D. Kurtz, Saddle River, NJ (US); Adam Kane, Morristown, NJ (US); Louis DeRosa, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 2 days.

(21) Appl. No.: 11/322,721

(22) Filed: Dec. 30, 2005

(65) Prior Publication Data

US 2007/0151357 A1    Jul. 5, 2007

(51) Int. Cl.
*G01L 1/00* (2006.01)

(52) U.S. Cl. .............................. 73/777; 73/716; 73/720; 73/726; 73/753; 73/754

(58) Field of Classification Search .................. 73/720, 73/726, 777
See application file for complete search history.

(56) References Cited

U.S. PATENT DOCUMENTS

| | | | |
|---|---|---|---|
| 4,388,668 A * | 6/1983 | Bell et al. ................. | 361/283.4 |
| 4,454,771 A * | 6/1984 | Shimazoe et al. ........ | 73/862.68 |
| 5,002,901 A | 3/1991 | Kurtz et al. | |
| 5,257,542 A * | 11/1993 | Voss ........................... | 73/724 |
| 5,286,671 A | 2/1994 | Kurtz et al. | |
| 5,461,001 A | 10/1995 | Kurtz et al. | |
| 5,891,751 A | 4/1999 | Kurtz et al. | |
| 6,229,427 B1 | 5/2001 | Kurtz et al. | |
| 6,439,056 B1 * | 8/2002 | Jonsson ........................ | 73/708 |
| 7,000,484 B2 * | 2/2006 | Kurtz et al. ................... | 73/796 |
| 7,124,639 B1 * | 10/2006 | Kurtz et al. ................... | 73/708 |
| 7,171,857 B2 * | 2/2007 | Barron ......................... | 73/719 |
| 7,212,096 B2 * | 5/2007 | Kurtz et al. ................... | 338/42 |

* cited by examiner

*Primary Examiner*—Edward Lefkowitz
*Assistant Examiner*—Freddie Kirkland, III
(74) *Attorney, Agent, or Firm*—Plevy, Howard & Darcy, PC

(57) ABSTRACT

A hermetically sealed displacement sensor has strain gauges placed on thin flexible triangular shaped beams of a load beam cell. The strain gauges are enclosed in a hermetically sealed cavity which cavity is sealed by means of a cover plate placed over the load beam cell. The thin beams are connected together by a center hub and basically form two constant moment beams. There is a top isolation diaphragm member which is convoluted and to which a force is applied which applied force is transmitted to the thin flexible beams. The beams deflect and the sensors produce an output proportional to strain. The sensors on each beam are two in number wherein one sensor is placed in a longitudinal direction with respect to the beam while the other sensor is in a transverse position. The sensors may be wired to form a full Wheatstone bridge or half bridges may be employed. The electrical output from the strain gauge bridge is proportional to the deflection of the center of the sensor.

20 Claims, 2 Drawing Sheets

HERMETICALLY SEALED DISPLACEMENT SENSOR APPARATUS

FIELD OF THE INVENTION

The present invention relates generally to displacement sensors and more particularly to a hermetically sealed displacement sensor using piezoresistors.

BACKGROUND OF THE INVENTION

Semiconductor piezoresistive transducers and displacement sensors have been widely known and are used in a great variety of applications including those applications having extremely harsh environments. Such devices may employ semiconductor or metal strain gages depending on the environment and application. For such applications, sensors have to be protected from the environment. For many applications the sensors must be contained within a cavity (usually a vacuum) to protect the strain gages. This vacuum cavity is hermetically sealed to maintain the vacuum and protect the sensing elements. Such protected sensors may be employed in displacement pressure sensors and used in many applications including, for example, medical, automotive, and aerospace applications.

Techniques for hermetically sealing semiconductor piezoresistors from hostile environments have generally limited the size of such devices. The reason for this is that additional lateral space is required to accommodate the hermetically sealing cover member. The piezoresistive transducer employs silicon resistive elements whose resistance varies according to intensity or magnitude of applied displacement upon an associated diaphragm. These resistors must be hermetically isolated from the external environment to ensure proper sensing performance and avoid destruction in harsh conditions.

For an example of hermetically sealed environmentally protected transducers, reference is made to U.S. Pat. No. 5,002,901 entitled "Method of Making Integral Transducer Structures Employing High Conductivity Surface Features", issued on Mar. 26, 1991 to A. D. Kurtz, et al and assigned to the assignee herein. In this patent the piezoresistive elements are formed over the central region of a dielectric layer which overlays a silicon diaphragm. The elements are arranged to form a Wheatstone bridge where four circuit nodes of the bridge are configured as four p+ silicon electrical contact posts disposed on the peripheral corners of the device. Electrical interconnections also comprised of p+ silicon interconnect the contact posts with the piezoresistive transducer elements. A bias voltage is brought to the two contacts where the voltage is measured between the other two contacts. In this manner the hermetic seal for this device is provided by fabricating the peripheral flange on the device's outer periphery beyond the contact posts, and an absolute cavity can be made which provides a vacuum reference. A glass sheet cover is then bonded to the top of the flange to create the hermetic seal. U.S. Pat. No. 5,891,751 entitled "Hermetically Sealed Transducers and Methods for Producing the Same", issued on Apr. 6, 1999 to A. D. Kurtz, et al and assigned to Kulite Semiconductor Products, Inc., the assignee herein, teaches a hermetically sealed semiconductor transducer and methods for fabricating the same. In this patent a sealing member hermetically seals an aperture whereby a vacuum is maintained between the transducer element and the cover member. The transducer element is hermetically sealed from the external environment while at least a portion of the electrical contact remains exposed to enable subsequent wire bonding thereto.

Reference is also made to U.S. Pat. No. 5,461,001 entitled "Methods for Making Semiconductor Structures Having Environmentally Isolated Elements", issued on Oct. 24, 1995 to A. D. Kurtz, et al and assigned to the assignee herein. This patent shows a method of fabricating semiconductor structures where one can provide a great number of hermetically sealed individual circuit devices using the methods described in the above noted patent. Reference is also made to U.S. Pat. No. 6,229,427 entitled "Covered Sealed Pressure Transducers and Methods for Making the Same", issued on May 8, 2001 to A. D. Kurtz, et al and assigned to the assignee herein. That patent shows a method which can be utilized to hermetically seal a raised feature of a sensing network of a silicon on oxide pressure transducer. The invention described in the '427 patent can also be utilized to hermetically seal the depressed feature sensing network of a diffused pressure transducer.

U.S. Pat. No. 5,286,671 entitled "Fusion Bonding Technique for Use in Fabricating Semi Conductor Devices", issued to A. D. Kurtz, et al on February 1994, relates to silicon oxide pressure transducers and methods for fabricating and bonding to such devices.

In view of the above it is extremely desirable to produce a hermetically sealed displacement sensor, which is easy to fabricate and which provides improved operation over prior art devices.

SUMMARY OF THE INVENTION

A hermetically sealed displacement transducer, comprising a load cell structure having a top surface and a bottom surface and having a thick outer peripheral area and a thick inner concentric central area with said outer peripheral area and said inner central area joined by two symmetrical thin beams directed along a common diameter with a first beam directed from an inner edge of said peripheral area to an outer edge of said central area, with a second beam directed along said diameter from an oppositely opposed inner edge of said peripheral area to an oppositely opposed outer edge of said inner area, said beams below the top surfaces of said peripheral and central areas and above the bottom surfaces thereof, at least a first strain gauge positioned on a surface of one beam, and at least a second strain gauge positioned on a corresponding surface of said second beam, a bottom cover member secured to said bottom surface of said peripheral area to cover and enclose said beams and said strain gauges, a top diaphragm cover member secured to said top surface of said peripheral area to cover and enclose said beams, with said cover member and said diaphragm member forming a hermetic cavity for said beams and strain gauges.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which:

FIG. 2 includes an isolation diaphragm and a bottom cover member;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in typical displacement sensor systems and methods. However, because such elements are well known in the art, and because they do not facilitate a better understanding of the present invention, a discussion of such elements is not provided herein. The disclosure herein is directed to all such variations and modifications known to those skilled in the art.

Figure 1:
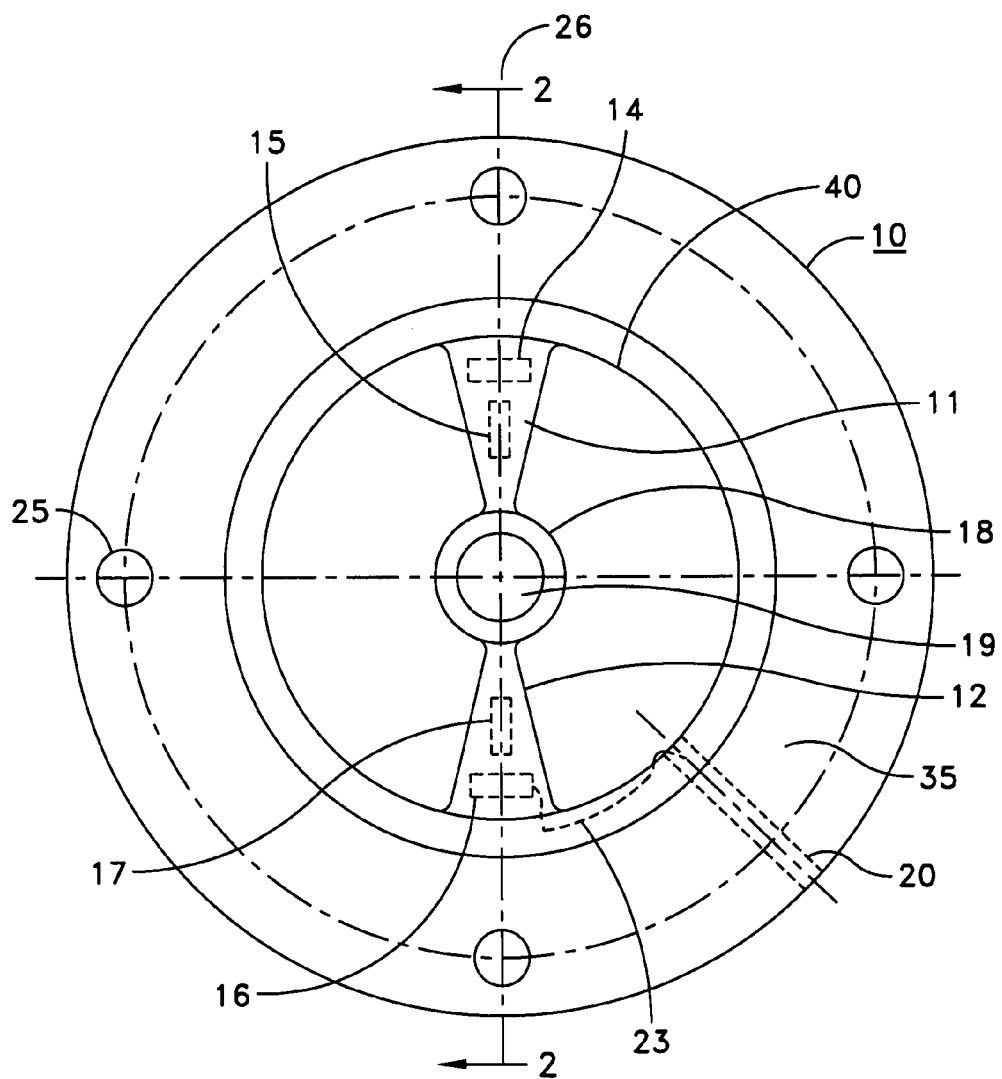
FIG. 1 is a top view of a displacement sensor beam according to this invention.
Figure 2:
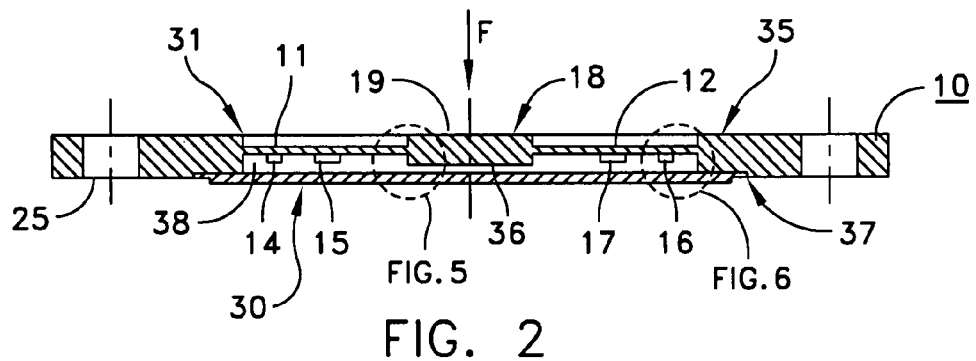
FIG. 2 is a cross sectional view taken through line 2-2 of the load cell shown in FIG. 1.

Referring to FIG. 1 there is shown a top view of a load cell beam arrangement 10 according to an embodiment of the present invention, the load cell and beams are integrally formed from a suitable metal. FIG. 2 depicts a cross sectional view of the load beam cell configuration of FIG. 1 taken through line 2-2 of FIG. 1. The load beam cell of FIG. 1 is shown in a top view and essentially is circular in configuration, but other geometrical configurations can be employed as well, including but not limited to rectangular, oval, square, and/or other geometries. As one can ascertain from FIG. 1 the load cell 10 has a thickened outer peripheral area 35 which is depicted in FIG. 2 as well. The outer area 35 is integral with two beams 11 and 12. While two beams are shown along the common diameter 26, it is understood that additional beam pairs may be disposed along common diameters of the load cell. For example, two beams may be placed along a diameter which is transverse to diameter 26. These beams do not necessarily require strain gages, but are formed with the load cell to prevent twisting and/or side-loading. The beams 11 and 12 as shown in FIG. 2 are thinned areas capable of deflecting. Both beams are generally triangular in shape and extend from a central hub 19 which central hub 19 is common to both beams and each beam is directed along a common diameter 25. The beams 11 and 12 as seen extend from the central hub along a common diameter 26 and gradually increase in size as they meet with the circular edge 40 of the load beam cell. The beams 11 and 12 are generally triangular having the base of the triangle at the edge 40 of the inner surface of area 35, and with the truncated apex integral with the outer periphery of hub 19. Thus, the corresponding beams with the common central hub are of a bow-tie configuration. However, other configurations may be used as well.

Each beam has located thereon piezoresistive sensors as 14 and 15 associated with beam 11 and 16 and 17 associated with beam 12. Each of the piezoresistive sensors is arranged so that one is positioned in a longitudinal direction and the other is in a transverse direction with respect to diameter 26. Piezoresistive sensors are silicon devices and are well known as being fabricated by many different techniques. In any event each of the piezoresistive silicon devices has leads such as lead 23 associated with device 16. The leads are directed through a common channel 20 which is directed from the periphery of the inner circle 40 to the outside of the load cell 10. This channel accommodates wires from each of the piezoresistive sensors. Typically the piezoresistive sensors are connected to form a full bridge such as a Wheatstone bridge whereby the output of the bridge would be proportional to a stress supplied to the beams. As seen in FIG. 2, each beam such as 11 and 12 is thin compared to the thicker outer peripheral member 35. The beams are integrally formed therewith and are much thinner than the outer peripheral area 35. In a typical example the outer peripheral area 35 may be about 0.15 inches thick with the beams being about 0.04 inches thick. The diameter of the cell shown in FIG. 1 which is the outer diameter is typically about 3 inches. The beams 11 and 12 as provided are two constant moment beams joined at the center via this central hub 19. As seen the central hub 19 has an outer area 18 which is depressed or located below the inner area 19. This depression is approximately 0.002 inches in height and is a recess to accommodate a top convoluted diaphragm cover. Peripheral region 35 also has apertures such as 25 located about the periphery, which apertures serve as mounting apertures to enable the entire load cell to be mounted on a surface. Therefore, a pressure can be applied to the cell 10 and which pressure would be directed to the thin beam sections of the load cell (FIG. 1)

Referring to the cross sectional view of FIG. 2, it is seen that the piezoresistor sensors 14, 15, 17 and 16 are enclosed within a hermetically sealed cavity 38. The cavity 38 is formed by placing a cover member 30 over the bottom surface of the cell shown in FIG. 1. The cover member 30 is attached (e.g. welded) to the outer concentric peripheral area 35 of the cell. As seen in FIG. 2 there is a step depression 37 whereby the outer periphery of the cover member is thinner and fits within the peripheral depression 37 formed in the outer thick concentric portion 35. A top cover 31 contains a series of convolutions (42a, 42b, . . . 42k) and essentially acts as an isolation diaphragm for the sensing device. The convoluted isolation diaphragm deflects for forces applied thereto are transmitted to the triangular beams 11 and 12 and are responded to by the hermetically sealed sensors. The cover member 30 is spaced apart from the central hub 19 by a space 36 to enable the diaphragm to deflect upon application of a force thereto. The force is applied essentially at the center whereby the triangular shaped thin beams act as two constant moment beams which are joined at the center portion.

Figure 3:
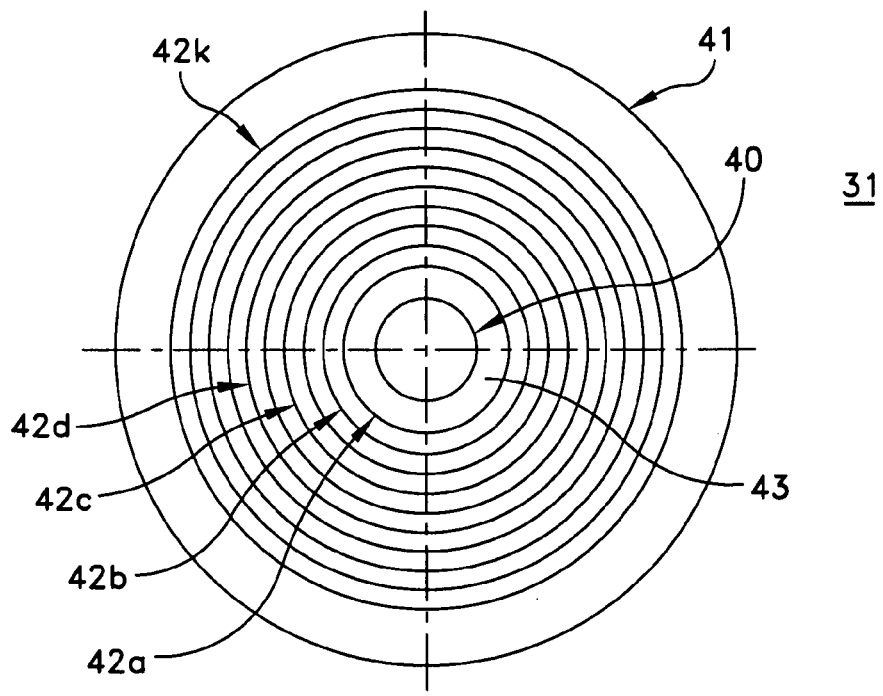
FIG. 3 is a top plan view of a convoluted isolation diaphragm shown in this invention.
Figure 4:
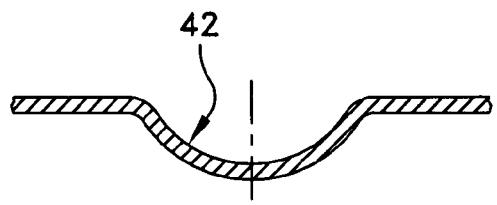
FIG. 4 is a sectional view showing the shape of a particular convolution.

FIG. 3 depicts the top isolation diaphragm showing the particular shape of the convolutions in FIG. 4. As seen in FIG. 4 the convoluted isolation diaphragm 41 has a central aperture 40 which central aperture surrounds the raised impression 19 (shown in FIG. 1). The rim or concentric area 43 sits on top of the depressed area 18 allowing the isolation diaphragm to be positioned as shown with a predetermined space 36 from the thin triangular beam sections 11 and 12. The convolution 42 is shown in detail in FIG. 4 and is round with the top facing the beams 11 and 12.

Figure 5:
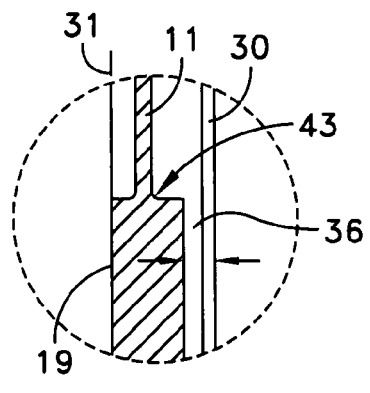
FIG. 5 is a detailed view depicting the area shown in FIG. 2 within a dashed circle; and, FIG. 6 is an enlarged sectional view depicting the area shown within the dashed circle of FIG. 2 designated as FIG. 6.
Figure 6:
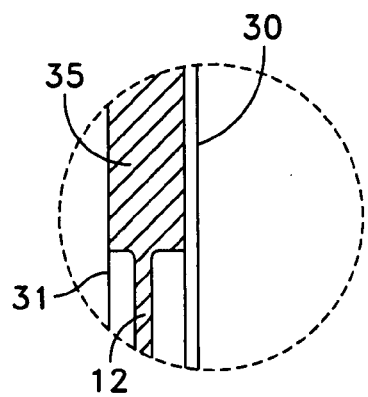

FIGS. 5 and 6 show the encircled sections of FIG. 2 in greater detail. From FIG. 5 and FIG. 6, one can visualize the relationship of the convoluted isolation diaphragm 31 and the bottom sealing cover 30 including the spacing 36 between the bottom cover member 30 and the central hub portion 19 of the cell. FIG. 6 again depicts the encircled area of FIG. 2 designated by the dashed circle labeled FIG. 6 and also shows the beam 12 which is integrally formed with the thick outer concentric peripheral area 35 showing the cover member 30 which is welded to the area 35 and showing the convoluted isolation diaphragm 31 in greater detail. The dimensions of course can vary for various structures but consistent with the above noted dimensions and referring to FIG. 5 it is indicated that the radius 43 depicted is typically 0.01 inches with the thickness of the convoluted cover member 31 being 0.002 inches and with the spacing 36 from the bottom of the member 19 to the outside of the cover 30 being 0.04 inches. In FIG. 6 the thickness of the bottom cover, which hermetically seals the sensors, is 0.015 inches. As previously indicated the thickness of the outer concentric area 35 is 0.14 inches while the thicknesses of the beams 11 and 12 are about 0.02 inches. Thus, the device has strain gauges 14 to 17 or piezoresistors placed on the flexible thin beams 11 and 12. The gauges are in a hermetically sealed cavity 38 which is formed by a top cover diaphragm member 31 and a bottom cover 30. The sensors are placed on the beams as by use of an apoxy or bonding agent. The beams are two constant moment beams joined at the center. The thin beams provide a compliant member to allow displacement of the sensor. The displacement produces a strain in the thin beams and by measuring the strain one obtains an electrical output proportional to the displacements. The electrical output from the device is proportional to the deflection of the center of the sensor. While typical dimensions were given above for a typical sensor it is understood that dimensions of the beams as well as thickness and diameters are selected to give the required displacement with minimal force imparted on the measured device.

One skilled in the art will understand how to formulate such dimensions depending upon the application. It is therefore apparent that there are many modifications which can be imparted by one skilled in the art. All such modifications are deemed to be encompassed in the spirit and scope of the enclosed claims.

It will be further apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

What is claimed is:

1. A hermetically sealed displacement transducer, comprising:
   a load cell structure having a top surface and a bottom surface and having a thick outer peripheral area and a thick inner concentric central area with said outer peripheral area and said inner central area joined by two symmetrical thin beams directed along a common diameter with a first beam directed from an inner edge of said peripheral area to an outer edge of said central area, with a second beam directed along said diameter from an oppositely opposed inner edge of said peripheral area to an oppositely opposed outer edge of said inner area, said beams below the top surfaces of said peripheral and central areas and above the bottom surfaces thereof,
   at least a first strain gauge positioned on a surface of one beam, and at least a second strain gauge positioned on a corresponding surface of said second beam,
   a bottom cover member secured to said bottom surface of said peripheral area to cover and enclose said beams and said strain gauges,
   a top diaphragm cover member secured to said top surface of said peripheral area to cover and enclose said beams, with said cover member and said diaphragm member forming a hermetic cavity for said beams and strain gauges.

2. The displacement transducer according to claim 1 further including a first longitudinal strain gauge mounted on said first beam and a second transverse strain gauge also mounted on said first beam, with a third longitudinal strain gauge mounted on said second beam in a location corresponding to the location of said first gauges on said first beam and a fourth transverse strain gauge mounted on said second beam in a location corresponding to said first beam location of said second gauge.

3. The displacement transducer according to claim 1 wherein said beams are two constant moment beams joined at their centers.

4. The displacement transducer according to claim 1 where each beam is generally of a triangular configuration with an apex end of said configuration located at the outer edge of said central area and with the base of said configuration located at the inner edge of said peripheral area.

5. The displacement transducer according to claim 1 wherein said beams are at least five times thinner than said peripheral area, with said peripheral area being slightly thicker than said central area, with the difference in thickness between said peripheral and central areas sufficient to accommodate diaphragm displacement.

6. The displacement transducer according to claim 1 wherein said top diaphragm cover member is a convoluted isolation diaphragm.

7. The displacement transducer according to claim 1 wherein said strain gauges are silicon piezoresistors.

8. The displacement transducer according to claim 1 wherein said bottom cover member is welded to said peripheral area.

9. The displacement transducer according to claim 1 wherein said top diaphragm member is welded to said peripheral area.

10. The displacement transducer according to claim 1 wherein said load cell and beams are integrally formed from a metal.

11. The displacement transducer according to claim 1 further including a plurality of apertures located on said thick peripheral area to enable the mounting of said transducer.

12. The displacement transducer according to claim 2 wherein said first, second, third and fourth gauges are connected in a Wheatstone bridge configuration.

13. The displacement transducer according to claim 1 further including a wire accommodating aperture directed from said inner edge of said peripheral area to the outer edge of said peripheral area to accommodate leads from said gauges.

14. The displacement transducer according to claim 1 wherein said outer peripheral area is circular with said inner central area circular and concentric therewith.

15. A displacement transducer, comprising:
   a thick outer section concentric with a thick inner central section, each section having a top and bottom surface, with said outer section connected to said central section by a first and a second diametrically located symmetrical thin beam sections integrally formed with said outer and central sections, said beams located between the top and bottom surfaces of said outer and central sections,
   at least a first strain gauge positioned on said first beam and at least a second strain gauge position on said second beam,
   a top diaphragm member secured to said top surface of said outer section to cover and enclose said beams and gauges,
   a bottom cover member secured to said bottom surface of said outer section to cover and enclose said beams and gauges, with said top diaphragm member and said bottom cover member forming a hermetic enclosure for said beams and gauges.

16. The transducer according to claim 15 further including a first longitudinal gauge positioned on said first beam, with a second transverse gauge position on said first beam, and a corresponding third longitudinal gauge position on said second beam with a fourth transverse gauge position on said second beam.

17. The transducer according to claim 16 wherein said first, second, third, and fourth gauges are connected as a Wheatstone bridge.

18. The transducer according to claim 17 wherein said gauges are silicon piezoresistors.

19. The transducer according to claim 15 wherein said top diaphragm member is a convoluted isolation diaphragm, with the tops of said convolutions facing said beams when said diaphragm covers the same.

20. The transducer according to claim 15 wherein said beams are triangular-like configurations with the apex area of the configuration located at said central section and with the base area located at said peripheral section.

* * * * *